United States Patent
Kim et al.

(10) Patent No.: US 9,354,120 B2
(45) Date of Patent: May 31, 2016

(54) AUTOCORRELATOR FOR THE MEASUREMENT OF THE PULSE WIDTH OF ULTRAFAST PULSE

(75) Inventors: Dong Eon Kim, Gyeongbuk (KR); Jung Kwuen An, Gyeongnam (KR)

(73) Assignee: POSTECH ACADEMY-INDUSTRY FOUNDATION, Pohang-si, Gyeongsangbuk-do (KR)

( * ) Notice: Subject to any disclaimer, the term of this patent is extended or adjusted under 35 U.S.C. 154(b) by 0 days.

(21) Appl. No.: 14/391,461

(22) PCT Filed: Jul. 27, 2012

(86) PCT No.: PCT/KR2012/006036
§ 371 (c)(1),
(2), (4) Date: Oct. 9, 2014

(87) PCT Pub. No.: WO2013/154232
PCT Pub. Date: Oct. 17, 2013

(65) Prior Publication Data
US 2015/0070705 A1    Mar. 12, 2015

(30) Foreign Application Priority Data
Apr. 9, 2012    (KR) .................. 10-2012-0036621

(51) Int. Cl.
*G01J 11/00*    (2006.01)
*G04F 13/02*    (2006.01)

(52) U.S. Cl.
CPC ............. *G01J 11/00* (2013.01); *G04F 13/026* (2013.01)

(58) Field of Classification Search
CPC ...... G01J 11/00; G04F 13/026; H01S 3/0057; H04W 52/243; G01B 9/02
USPC .......................... 356/445, 447, 448
See application file for complete search history.

(56) References Cited

U.S. PATENT DOCUMENTS 5,585,913 A * 12/1996 Hariharan ............... G01P 3/806
    356/4.09
5,781,293 A * 7/1998 Padgett ................. G01J 3/4531
    356/453

(Continued)

FOREIGN PATENT DOCUMENTS

JP    2004-343058 A    12/2004
JP    2009-244446 A    10/2009

(Continued)

OTHER PUBLICATIONS

Jungkwuen An, et al; "Compact in-line autocoreelator using double wedge", Optics Express, vol. 20, No. 3, pp. 3325-3330; Published Jan. 27, 2012.

(Continued)

*Primary Examiner* — Michael P Lapage
(74) *Attorney, Agent, or Firm* — Ladas & Parry LLP

(57) ABSTRACT

Disclosed is an autocorrelator for generating an autocorrelation signal for an ultrashort pulse to measure the ultrashort pulse. The autocorrelator comprises: a light source unit for generating an optical pulse; a double wedge interferometer in which a first wedge and a second wedge serving as a wedge-shaped optical medium are arranged such that facing surfaces of the first and second wedges are parallel to each other, so as to separate the optical pulse provided by the light source unit to generate two optical pulses; a harmonic light medium for receiving the generated two optical pulses to generate second harmonic light; and a measurement unit for detecting the second harmonic light to generate an autocorrelation signal. Thus, the time width of an ultrashort pulse can be measured by an interferometer using only two wedge-shaped optical components.

10 Claims, 4 Drawing Sheets

(56) References Cited

U.S. PATENT DOCUMENTS

| | | | | |
|---|---|---|---|---|
| 5,852,620 | A | * | 12/1998 | Wan .................... G02B 5/3083 372/105 |
| 6,195,167 | B1 | * | 2/2001 | Reid ....................... G01J 11/00 356/450 |
| 7,643,212 | B1 | * | 1/2010 | Sokoloff ............ G02B 26/0883 356/450 |
| 2002/0118721 | A1 | * | 8/2002 | Bittenson ............... G02B 27/14 372/100 |
| 2004/0233494 | A1 | | 11/2004 | Van Der Pasch et al. |

FOREIGN PATENT DOCUMENTS

| | | |
|---|---|---|
| KR | 1020020070128 A | 9/2002 |
| KR | 100855901 B1 | 8/2008 |

OTHER PUBLICATIONS

International Search Report dated Feb. 25, 2013; PCT/KR2012/006036.

* cited by examiner

AUTOCORRELATOR FOR THE MEASUREMENT OF THE PULSE WIDTH OF ULTRAFAST PULSE

TECHNICAL FIELD

The following description relates to measurement of an optical pulse, and more particularly, to an autocorrelator measuring by generating an autocorrelation signal with respect to an ultrashort pulse.

BACKGROUND ART

An autocorrelator is an apparatus for measuring a short sub-picosecond pulse which cannot be directly measured by an optoelectronic apparatus. Supposing that a function with respect to a time of an electric field of an optical pulse is E(t), the autocorrelator generates an autocorrelation function represented by $A(t)=\int |E^2(t)E^2(t-\tau)|^2 d\tau$. Here, $\tau$ represents a delay time. Further, a time width of a pulse used in measurement is estimated using an autocorrelation function generated by the autocorrelator.

The autocorrelator includes an interferometer part for controlling a delay time by dividing a pulse in two, and a measurement part for measuring by generating a secondary harmonic wave with respect to the two generated pulses using a nonlinear optical medium.

FIG. 1 is a conceptual diagram of a conventional autocorrelator using a Michelson interferometer. The conventional autocorrelator may use the Michelson interferometer 10. An optical pulse which is incidenton the Michelson interferometer 10 may bedivided into two pulses by a beam splitter 11. Here, the beam splitter 11 included in the Michelson interferometer 10 may divide a beam into beam splitter 11 included in the Michelson interferometer 10 may divide a beam into at angle of 90 degrees. The beam divided by the beam splitter 11 may be reflected by a reflective mirror 12. That is, the Michelson interferometer 10 may generate two pulses using two beam splitters 11 and four reflective mirrors 12. Further, the two pukes generated by the Michelson interferometer 10 may be converted into a secondary harmonic wave by passing through a secondary harmonic wave medium 20.

The autocorrelator using the Michelson interferometer 10 needs the two beam splitters 11 and the four reflective mirrors 12 in order to constitute a balanced interferometer. That is, since production of the autocorrelator and volume of the autocorrelator are determined by the Michelson interferometer, there are limitations in reducing production costs of the autocorrelator and decreasing the volume of the autocorrelator.

DISCLOSURE

Technical Problem

The present invention is directed to providing an autocorrelator capable of measuring a time width of an ultrashort pulse.

The present invention is further directed to providing an autocorrelator in which the number of optical components and a volume can be reduced.

Technical Solution

An aspect of the present invention provides an autocorrelator, including: a light source unit configured to generate an optical pulse; a double-wedge interferometer arranged so that opposing surfaces of a first wedge and a second wedge, which are wedge-shaped optical media, are parallel to each other, and configured to generate two optical pulses by dividing the optical pulse provided by the light source unit; a harmonic wave medium configured to receive the two generated optical pulses, and generate a secondary harmonic wave; and a measurement unit configured to detect the secondary harmonic wave and generate an autocorrelation signal.

Here, the double-wedge interferometer may be configured so that the opposing surfaces of the first wedge and the second wedge are parallel to each other and the first wedge and the second wedge are symmetric with respect to a plane located in the center of an interval between the first wedge and the second wedge.

Here, the double-wedge interferometer may adjust an interval between the first wedge and the second wedge by fixing one of the first wedge and the second wedge and moving the other along an optical axis.

Here, a front side of the first wedge and a rear side of the second wedge may be coated to have the same reflectivity, and a rear side of the first wedge may be coated with an anti-reflection coating.

Here, the double-wedge interferometer divides the optical pulse provided by the light source unit into the two optical pulses at a front side of the second wedge.

Here, the optical pulse generated by the light source unit may be incident on the front side of the first wedge, and the two optical pulses may be emitted to the rear side of the second wedge.

Here, the double-wedge interferometer may be configured so that a rear side of the first wedge and a front side of the second wedge are parallel to each other, a front side and a rear side of the first wedge are not parallel to each other and have a constant angle $\theta$, and the rear side and the front side of the second wedge are not parallel to each other and have the constant angle $\theta$.

Here, the optical pulse generated by the light source unit may be incident on the front side of the first wedge, the optical pulse incident on the first wedge may be divided into the a first optical pulse and a second optical pulse at the front side of the second wedge, the first optical pulse may proceed in an opposite direction of the optical pulse incident on the first wedge, and the second optical pulse may proceed in a direction to be incident on the second wedge.

Here, the first optical pulse may be reflected at the front side of the first wedge, the second optical pulse may be reflected at the rear side of the second wedge, and the first optical pulse and the second optical pulse may meet at the front side of the second wedge.

Here, the first optical pulse and the second optical pulse that meet at the front side of the second wedge may be emitted to the rear side of the second wedge.

Here, the harmonic wave medium may be beta-barium borate.

Advantageous Effects

According to the autocorrelator according to an embodiment of the present invention described above, the pulse duration can be easily measured by generating an autocorrelation signal with respect to an ultrashort signal using a double-wedge interferometer.

Further, in the autocorrelator according to an embodiment of the present invention, the number of optical components and a volume can be reduced using the double-wedge interferometer.

MODES OF THE INVENTION

Various embodiments will now be described more fully with reference to the accompanying drawings in which some embodiments are shown. However, it should be understood that these inventive concepts are not construed as limited to the embodiments set forth herein, and include every modification, equivalent, and substitute included in the spirit and the scope of the inventive concepts. In description of each drawing, similar numerals are used with respect to similar components.

It will be understood that, although the terms first, second, A, B, etc. may be used herein in reference to elements of the invention, such elements should not be construed as limited by these terms. Such terms are used only to distinguish one element from another element. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Embodiments of the present invention will be described below with reference to accompanying drawings.

Figure 1:
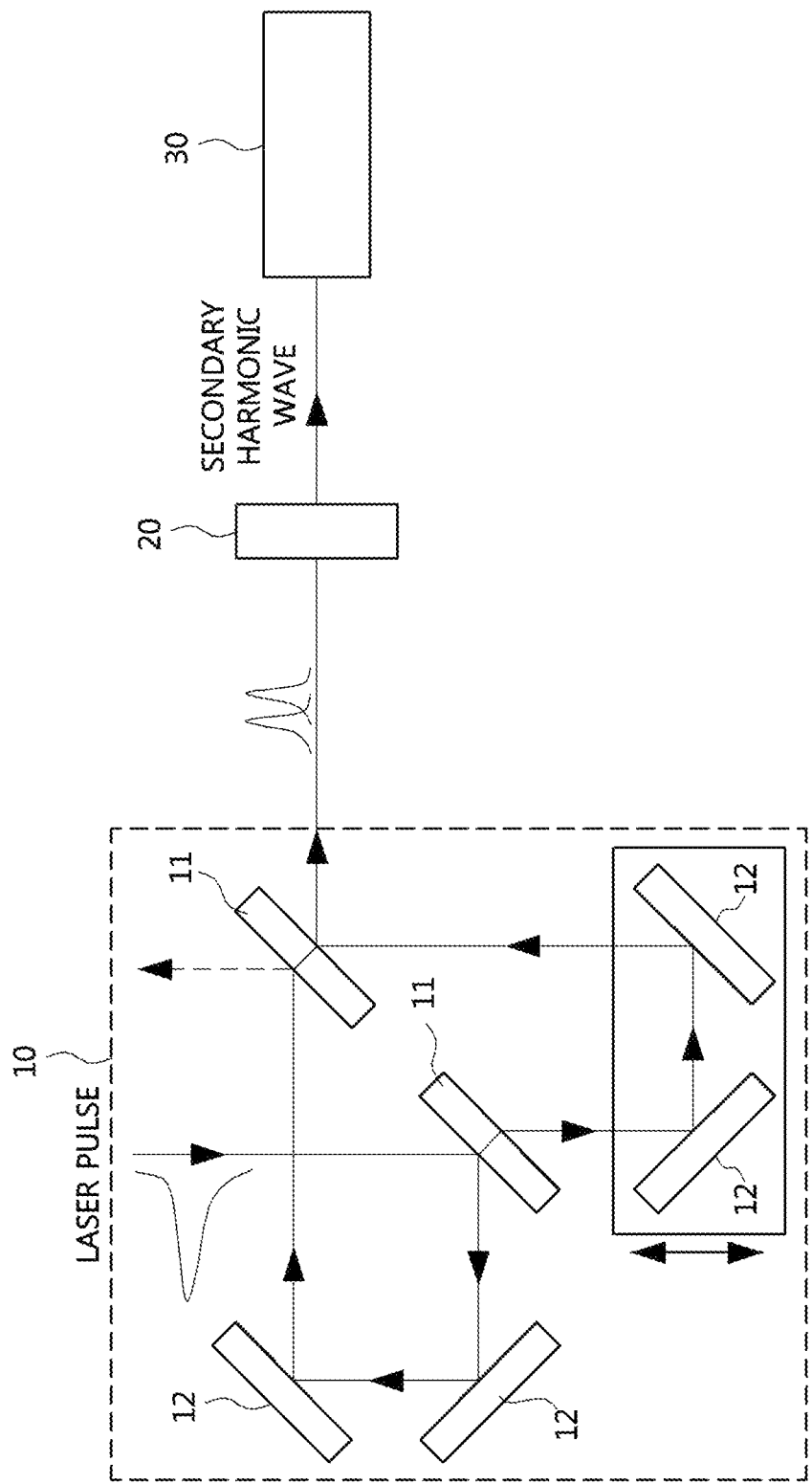
FIG. 1 is a conceptual diagram illustrating a conventional autocorrelator using a Michelson interferometer.
Figure 2:
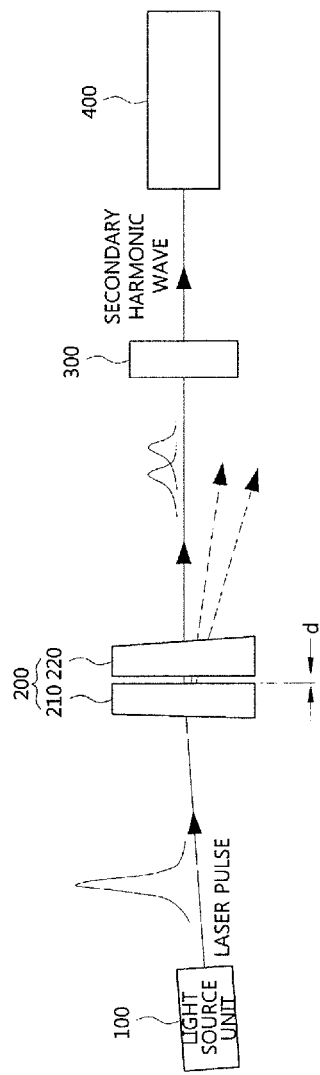
FIG. 2 is a conceptual diagram illustrating an autocorrelator according to an embodiment of the present invention.

FIG. 2 is a conceptual diagram illustrating an autocorrelator according to an embodiment of the present invention.

Referring to FIG. 2, the autocorrelator according to an embodiment of the present invention may include a light source unit 100, a double-wedge interferometer 200, a harmonic wave medium 300, and a measurement unit 400.

The light source unit 100 may provide an optical pulse or a laser pulse to the double-wedge interferometer 200. The light source unit 100 may be a light emitting diode, a laser diode, etc. It may be desirable to use the laser diode that is very straight and has a great amount of light as the light source unit 100, but the light source unit 100 is not limited thereto.

The double-wedge interferometer 200 may include a first wedge 210 and a second wedge 220, which are wedge-shaped optical media. The first wedge 210 and the second wedge 220 may be optical components in which a front side and a rear side are not parallel to each other but maintain a constant angle. For example, each of the first wedge 210 and the second wedge 220 may have a V-shaped wedge shape, and be formed of a fused silica material. For example, an optical pulse provided by the light source unit 100 may be incident on a front side 211 of the first wedge 210, and two optical pulses may be emitted to a rear side 222 of the second wedge 220. Further, according to distribution characteristics of an ultrashort pulse, the pulse is changed as a distance for which it passes through a medium increases. Accordingly, it may be desirable to reduce thicknesses of the first wedge 210 and the second wedge 220.

The double-wedge interferometer 200 may have a shape in which the first wedge 210 and the second wedge 220 maintain a constant interval d and are parallel to each other. Further, the double-wedge interferometer 200 may be arranged so that opposing surfaces of the first wedge 210 and the second wedge 220 are parallel to each other and the first wedge 210 and the second wedge 220 are symmetric. For example, the rear side 212 of the first wedge 210 and the front side 221 of the second wedge 220 may be arranged to face and be parallel to each other. That is, the double-wedge interferometer 220 may be arranged so that the opposing surfaces of the first wedge 210 and the second wedge 220 are parallel to each other and the first wedge 210 and the second wedge 220 are symmetric with respect to a surface located in the center of an interval between the first wedge 210 and the second wedge 220.

The interval d between the first wedge 210 and the second wedge 220 may be adjusted by moving the first wedge 210 or the second wedge 220. For example, the interval d may be adjusted by fixing one of the first wedge 210 and the second wedge 220 and moving the other wedge along an optical axis. Here, the optical axis may be a vertical axis with respect to a plane in which the first wedge 210 and the second wedge 220 face each other.

According to an embodiment of the present invention, the double-wedge interferometer 200 may divide a laser pulse incident on the front side 211 of the first wedge 210 into two laser pulses having an angle of 180 degrees. That is, the double-wedge interferometer 200 may divide one laser pulse into the two laser pulses, and emit the two divided laser pulses to the rear side 222 of the second wedge 220 through different paths. A delay time between the two laser pulses emitted to the rear side 222 of the second wedge 220 through the different paths may be generated due to a difference between the paths. The delay time may be controlled by adjusting the interval d between the first wedge 210 and the second wedge 220. For example, the delay time may be controlled to be proportional to twice the interval d between the first wedge 210 and the second wedge 220.

The harmonic wave medium 300 may receive the two optical pulses emitted from the double-wedge interferometer 200, generate a secondary harmonic wave, and emit the generated secondary harmonic wave to the nonlinear optical medium. For example, the harmonic wave medium 300 may be beta-barium borate (BBO).

The measurement unit 400 may detect the secondary harmonic wave, and generate an autocorrelation signal. The autocorrelation signal may be obtained by monitoring a spectral power integrated in a bandwidth of the secondary harmonic wave. In the measurement by the measurement unit 400, the autocorrelation signal may be obtained while changing the interval d between the first wedge 210 and the second wedge 220.

Accordingly, the autocorrelator according to an embodiment of the present invention may include the light source unit 100 generating the optical pulse, the double-wedge interferometer 200 generating the two optical pulses through opposing surfaces of the first wedge 210 and the second wedge 220 arranged to be parallel to each other and dividing the optical pulse provided from the light source unit 100, the harmonic wave medium 300 generating the secondary harmonic wave by receiving the two generated optical pulses, and the measurement unit 400 detecting the secondary harmonic wave and generating the autocorrelation signal.

Further, the pulse duration may be estimated by the autocorrelation signal. A photodiode detector or a spectrometer may be used as the measurement unit 400, but it may be easy to measure the delay time using a spectrometer.

Figure 3:
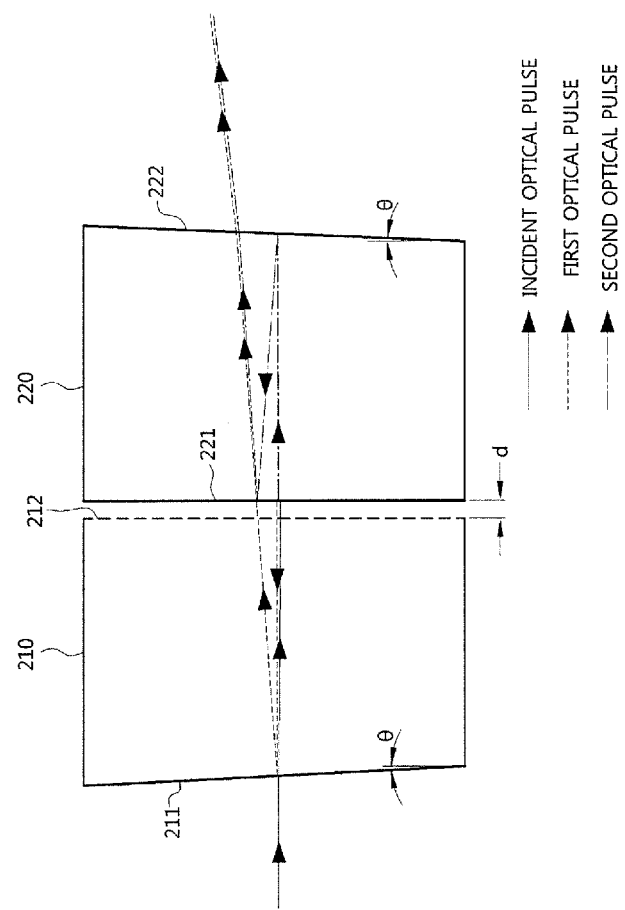
FIG. 3 is a cross-sectional view illustrating a double-wedge interferometer shown in FIG. 2.

FIG. 3 is a cross-sectional view illustrating a double-wedge interferometer shown in FIG. 2.

Referring to FIG. 3, a double-wedge interferometer 200 according to an embodiment of the present invention may include a first wedge 210 and a second wedge 220. The first wedge 210 and the second wedge 220 may be arranged so that a rear side 212 of the first wedge 210 and a front side 221 of the second wedge 220 are parallel and face each other, and an interval between the first wedge 210 and the second wedge 220 is d. A front side 211 and the rear side 212 of the first wedge 210 may not be parallel to each other and may have a constant angle θ, and also the front side 221 and a rear side 222 of the second wedge 220 may not be parallel to each other and may have the constant angle θ. Here, the constant angle θ may be an inclined angle with respect to a plane in which the first wedge 210 and the second wedge 220 face each other. Further, the interval d between the first wedge 210 and the second wedge 220 may be adjusted by moving the first wedge 210 or the second wedge 220. Preferably, the interval d between the first wedge 210 and the second wedge 220 may be adjusted by fixing one wedge and moving the other wedge along an optical axis.

The front side 211 and the rear side 212 of the first wedge 210 may have different reflectivities and transmissivities. Further, the front side 221 and the rear side 222 of the second wedge 220 may have different reflectivities and transmissivities.

The front side 211 of the first wedge 210 and the rear side 222 of the second wedge 220 may be coated to have the same reflectivity (for example, 33%), and the rear side 212 of the first wedge 210 may be coated with an anti-reflection coating to emit every incident optical pulse.

Further, the front side 221 of the second wedge 220 may function as a beam splitter dividing the incident optical pulse. Accordingly, the second wedge 220 may divide the incident optical pulse into two optical pulses having an angle of 180 degrees. For this, the front side 221 of the second wedge 220 may be coated to have a reflectivity of 50%.

According to an embodiment of the present invention, a path of the optical pulse when the optical pulse is incident on the front side 211 of the first wedge 210 will be described.

The optical pulse may be incident through the front side 211 of the first wedge 210. The optical pulse incident on the first wedge 210 may be divided into a first optical pulse and a second optical pulse at the front side 221 of the second wedge 220. An angle between the first optical pulse and the second optical pulse may be 180 degrees. The first optical pulse may proceed in the opposite direction of the incident optical pulse, and the second optical pulse may proceed in a direction in which it will be incident on the second wedge 220.

The first optical pulse may be reflected at the front side 211 of the first wedge 210, and the second optical pulse may be reflected at the rear side 222 of the second wedge 220. Further, the first optical pulse reflected at the front side 211 of the first wedge 210 and the second optical pulse reflected at the rear side 222 of the second wedge 220 may meet at the front side 221 of the second wedge 220. The first optical pulse reaching the front side 221 of the second wedge 220 may proceed after being incident on the second wedge 220, and the second optical pulse reaching the front side 221 of the second wedge 220 may be reflected at the front side 221 of the second wedge 220 and proceed in a direction in which it will be incident on the second wedge 220. As a result, the first optical pulse and the second optical pulse may be emitted from the double-wedge interferometer 200 through the rear side 222 of the second wedge 220.

As described above, the first optical pulse and the second optical pulse generated by the double-wedge interferometer 200 may be incident on a harmonic wave medium 300. The harmonic wave medium 300 may generate a secondary harmonic wave when the first optical pulse and the second optical pulse are incident on the harmonic wave medium 300. Further, the measurement unit 400 may detect the secondary harmonic wave generated by the harmonic wave medium 300, and generate an autocorrelation signal.

Figure 4:
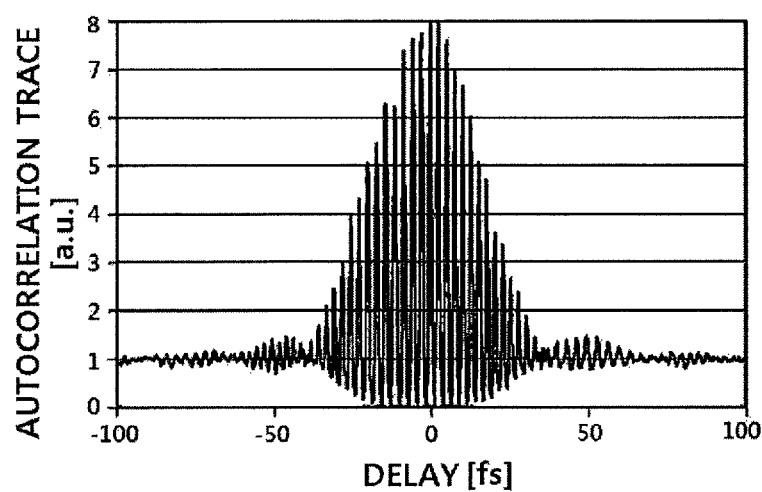
FIG. 4 is a graph illustrating an autocorrelation signal obtained by the autocorrelator according to an embodiment of the present invention.

FIG. 4 is a graph illustrating an autocorrelation signal obtained by the autocorrelator according to an embodiment of the present invention.

Referring to FIG. 4, an autocorrelator according to an embodiment of the present invention may obtain an autocorrelation signal with respect to a pulse having a sub-picosecond time width.

In the autocorrelator according to an embodiment of the present invention, the first wedge 210 and the second wedge 220 may have thicknesses of 2 mm, and be formed of a fused silica material. Further, the front side 211 and the rear side 212 of the first wedge 210 may not be parallel to each other and may have a constant angle θ of 2 degrees, and also the front side 221 and the rear side 222 of the second wedge 220 may not be parallel to each other and may have the constant angle θ of 2 degrees. Further, the front side 211 of the first wedge 210 and the rear side 222 of the second wedge 220 may be coated to have a reflectivity of 33%, and the front side 221 of the second wedge 220 may be coated to have a reflectivity of 50%. The rear side 212 of the first wedge 210 may be coated with an anti-reflection coating corresponding to a central wavelength 800 nm of the incident optical pulse. BBO may be used as the harmonic wave medium 300.

In this case, the autocorrelation signal obtained in the measurement unit 400 by adjusting the interval between the first wedge 210 and the second wedge 220 is shown in FIG. 4. The autocorrelation signal with respect to the optical pulse having a time width of 29 fs using the autocorrelator according to an embodiment of the present invention may be obtained, and thus the pulse duration may be estimated.

As described above, the autocorrelator according to an embodiment of the present invention may measure the time width with respect to the ultrashort pulse by using an interferometer including only the two wedge-shaped optical components.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An autocorrelator, comprising:
a light source unit configured to generate an optical pulse;
a double-wedge interferometer arranged so that facing surfaces of a first wedge and a second wedge, which are wedge-shaped optical media, are parallel to each other, and configured to generate two optical pulses by dividing the optical pulse provided by the light source unit;
a harmonic wave medium configured to receive the two generated optical pulses, and generate a secondary harmonic wave; and
a measurement unit configured to detect the secondary harmonic wave and generate an autocorrelation signal,
wherein the double-wedge interferometer is configured so that the facing surfaces of the first wedge and the second wedge are parallel to each other and the first wedge and the second wedge are symmetric with respect to a plane located in the center of an interval between the first wedge and the second wedge.

2. The autocorrelator according to claim 1, wherein the double-wedge interferometer is configured so that a rear side of the first wedge and a front side of the second wedge are parallel to each other, a front side and a rear side of the first wedge are not parallel to each other and have a constant angle θ, and the rear side and the front side of the second wedge are not parallel to each other and have the constant angle θ.

3. The autocorrelator according to claim 2, wherein the optical pulse generated by the light source unit is incident on the front side of the first wedge, the optical pulse incident on the first wedge is divided into the a first optical pulse and a second optical pulse at the front side of the second wedge, the first optical pulse proceeds in an opposite direction of the optical pulse incident on the first wedge.

4. The autocorrelator according to claim 3, wherein the first optical pulse is reflected at the front side of the first wedge, the second optical pulse is reflected at the rear side of the second wedge, and the first optical pulse and the second optical pulse meet at the front side of the second wedge.

5. The autocorrelator according to claim 4, wherein the first optical pulse and the second optical pulse that meet at the front side of the second wedge propagate to the rear side of the second wedge.

6. The autocorrelator according to claim 1, wherein the harmonic wave medium is beta-barium borate.

7. An autocorrelator, comprising:
a light source unit configured to generate an optical pulse;
a double-wedge interferometer arranged so that facing surfaces of a first wedge and a second wedge, which are wedge-shaped optical media, are parallel to each other, and configured to generate two optical pulses by dividing the optical pulse provided by the light source unit;
a harmonic wave medium configured to receive the two generated optical pulses, and generate a secondary harmonic wave; and
a measurement unit configured to detect the secondary harmonic wave and generate an autocorrelation signal,
wherein the double-wedge interferometer adjusts an interval between the first wedge and the second wedge by fixing one of the first wedge and the second wedge and moving the other along an optical axis.

8. An autocorrelator, comprising:
a light source unit configured to generate an optical pulse;
a double-wedge interferometer arranged so that facing surfaces of a first wedge and a second wedge, which are wedge-shaped optical media, are parallel to each other, and configured to generate two optical pulses by dividing the optical pulse provided by the light source unit;
a harmonic wave medium configured to receive the two generated optical pulses, and generate a secondary harmonic wave; and
a measurement unit configured to detect the secondary harmonic wave and generate an autocorrelation signal,
wherein a front side of the first wedge and a rear side of the second wedge are coated to have the same reflectivity, and a rear side of the first wedge is coated with an anti-reflection coating.

9. The autocorrelator according to claim 8, wherein the double-wedge interferometer divides the optical pulse provided by the light source unit into the two optical pulses at a front side of the second wedge.

10. The autocorrelator according to claim 8, wherein the optical pulse generated by the light source unit is incident on the front side of the first wedge, and the two optical pulses are emitted to the rear side of the second wedge.

* * * * *